United States Patent
Hansen et al.

(10) Patent No.: US 8,584,934 B2
(45) Date of Patent: *Nov. 19, 2013

(54) CASH PAYMENT FOR REMOTE TRANSACTIONS

(71) Applicant: The Western Union Company, Englewood, CO (US)

(72) Inventors: Kurt Hansen, Castle Rock, CO (US); Earney E. Stoutenburg, Parker, CO (US); Thomas B. Sayor, Castle Rock, CO (US)

(73) Assignee: The Western Union Company, Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/647,227

(22) Filed: Oct. 8, 2012

(65) Prior Publication Data
US 2013/0036056 A1    Feb. 7, 2013

Related U.S. Application Data

(63) Continuation of application No. 13/215,713, filed on Aug. 23, 2011, now Pat. No. 8,286,861, which is a continuation of application No. 11/283,535, filed on Nov. 18, 2005, now Pat. No. 8,025,212, which is a continuation-in-part of application No. 10/444,928, filed on May 22, 2003, now Pat. No. 6,994,251, which is a continuation-in-part of application No. 10/289,802, filed on Nov. 7, 2002, now Pat. No. 6,761,309, which is a continuation of application No. 09/427,249, filed on Oct. 26, 1999, now Pat. No. 6,488,203.

(51) Int. Cl.
*G06F 17/00* (2006.01)

(52) U.S. Cl.
USPC .......................................... 235/379; 235/382

(58) Field of Classification Search
USPC ............... 235/379, 382, 388, 462.46, 472.02; 705/39, 40, 66–72
See application file for complete search history.

(56) References Cited

U.S. PATENT DOCUMENTS

| | | | |
|---|---|---|---|
| 4,032,931 A | 6/1977 | Haker | |
| 4,454,414 A | 6/1984 | Benton | |

(Continued)

FOREIGN PATENT DOCUMENTS

| | | |
|---|---|---|
| EP | 1077436 A2 | 2/2001 |
| WO | 00/22559 A1 | 4/2000 |
| WO | 00/67177 A2 | 11/2000 |

OTHER PUBLICATIONS

Author Unknown, "Online Payment Services" Auctionbytes.com, Nov. 2002. 3 pages. Retrieved from: http://web.archive.org/web/20030801203918/http://www.auctionbytes.com/cab/pages/payment.

(Continued)

*Primary Examiner* — Daniel St Cyr
(74) *Attorney, Agent, or Firm* — Kilpatrick Townsend & Stockton LLP

(57) ABSTRACT

Methods coordinate payment for a remote transaction with a first party. An identification of the first party is received at a host system. Acknowledgment of receipt of a cash payment from a second party is received. The cash payment is associated with the identification of the first party. A money transfer corresponding to the cash payment to the control of the first party is executed with a request for the first party to perform on previously agreed terms of the remote transaction.

20 Claims, 6 Drawing Sheets

(56) References Cited

U.S. PATENT DOCUMENTS

| | | | |
|---|---|---|---|
| 5,220,501 | A | 6/1993 | Lawlor et al. |
| 5,283,829 | A | 2/1994 | Anderson |
| 5,326,960 | A | 7/1994 | Tannenbaum |
| 5,350,906 | A | 9/1994 | Brody et al. |
| 5,461,217 | A | 10/1995 | Claus |
| 5,650,604 | A | 7/1997 | Marcous et al. |
| 5,764,888 | A | 6/1998 | Bolan et al. |
| 5,787,403 | A | 7/1998 | Randle |
| 5,826,241 | A | 10/1998 | Stein et al. |
| 5,897,989 | A | 4/1999 | Beecham |
| 5,899,982 | A | 5/1999 | Randle |
| 5,902,983 | A | 5/1999 | Crevelt et al. |
| 5,903,881 | A | 5/1999 | Schrader et al. |
| 5,913,202 | A | 6/1999 | Motoyama |
| 5,920,629 | A | 7/1999 | Rosen |
| 5,920,848 | A | 7/1999 | Schutzer et al. |
| 5,949,044 | A * | 9/1999 | Walker et al. ............... 235/379 |
| 6,003,763 | A | 12/1999 | Gallagher et al. |
| 6,012,048 | A | 1/2000 | Gustin et al. |
| 6,027,216 | A | 2/2000 | Guyton et al. |
| 6,035,406 | A | 3/2000 | Moussa et al. |
| 6,039,250 | A | 3/2000 | Ito et al. |
| 6,064,990 | A | 5/2000 | Goldsmith |
| 6,070,156 | A | 5/2000 | Hartsell, Jr. |
| 6,119,106 | A | 9/2000 | Mersky et al. |
| 6,275,829 | B1 | 8/2001 | Angiulo et al. |
| 6,314,169 | B1 | 11/2001 | Schelberg, Jr. et al. |
| 6,332,134 | B1 * | 12/2001 | Foster ..................... 705/36 R |
| 6,351,739 | B1 | 2/2002 | Egendorf |
| 6,367,693 | B1 | 4/2002 | Novogrod |
| 6,488,203 | B1 | 12/2002 | Stoutenburg et al. |
| 6,547,132 | B1 | 4/2003 | Templeton et al. |
| 6,761,309 | B2 * | 7/2004 | Stoutenburg et al. ......... 235/379 |
| 6,827,260 | B2 | 12/2004 | Stoutenburg et al. |
| 6,886,742 | B2 | 5/2005 | Stoutenburg et al. |
| 6,994,251 | B2 | 2/2006 | Hansen et al. |
| 7,070,094 | B2 | 7/2006 | Stoutenburg et al. |
| 7,086,584 | B2 | 8/2006 | Stoutenburg et al. |
| 7,110,978 | B1 | 9/2006 | Chin |
| 7,225,154 | B2 | 5/2007 | Hansen |
| 7,600,673 | B2 | 10/2009 | Stoutenburg et al. |
| 7,849,006 | B2 | 12/2010 | Hansen et al. |
| 8,025,212 | B2 * | 9/2011 | Hansen et al. ............... 235/379 |
| 8,286,861 | B2 * | 10/2012 | Hansen et al. ............... 235/379 |
| 2003/0061155 | A1 | 3/2003 | Chin |
| 2003/0187789 | A1 | 10/2003 | Karas et al. |
| 2003/0187792 | A1 | 10/2003 | Hansen et al. |
| 2004/0024701 | A1 | 2/2004 | Hansen et al. |
| 2004/0088248 | A1 | 5/2004 | Cutler |
| 2006/0131387 | A1 | 6/2006 | Hansen et al. |
| 2012/0054069 | A1 | 3/2012 | Hansen et al. |

OTHER PUBLICATIONS

Author Unknown, "PayPal News", Andrys.com, 2002, 3 pages. Retrieved from: http://web.archive.org/web/20021203035401/http://www.andrys.com/paypal.html.

Author Unknown, "PayPal.com Case Study" Fox Rollins.edu, 2001, 6 pages. Retrieved from: http://web.archive.org/web/20010717185206/http://fox.rollins.edu/~stackman/paypal.htm.

Author Unknown, "How to Send a Western Union Money Transfer®—Money in Minutes," Western Union Holdings Inc., 2001-2004, [retrieved on Dec. 6, 2004], 2 pages. Retrieved from: http://www.westernunion.com/info/howToSendMoneyTransfer.asp.

Boneh, D., "Beaming Money by Email is Web's Next killer App", PR Newswire. Nov. 1999, 5 pages.

Business Editors and High-Tech Writers, "billserv.com Launches bills.com, an Internet Portal for Consumers to Pay Bills Online at No Cost." Business Wire, Feb. 2000, [retrieved on Dec. 28, 2004]. 2 pages. Retrieved from: http://www.proquest.umi.com.

Confinity, Inc , "PayPal for the Palm," HandheldNews.com. 2006, [retrieved on Feb. 14, 2006], 2 pages. Retrieved from: www.handheldnew.com/file.asp?ObjectID=5401.

Epper Hoffman, K., "PayPal Still Running Free, But the e-payments company's carefree days may be numbered if regulators decide it's essentially a bank," Bank Technology News, 2001 [retrieved on Feb. 14, 2006], 3 pages. Retrieved from: www.banktechnews.com/article.html?id=200405172GJQLGIV.

Latour, A., "PayPal Electronic Plan May be On the Money in Years to Come," The Wall Street Journal Interactive Edition, Nov. 15, 1999, [retrieved on Feb. 14, 2006], 2 pages. Retrieved from: http://www.paypal.com/html/wsj.html.

Plotkin, H., "Beam Me Up Some Cash," Silicon Valley Insider, Sep. 8, 1999, [retrieved on Feb. 14, 2006]. 3 pages. Retrieved from: www.halplotkin.com/cnbcs029.htm.

Steiner, I., "PayPal Online Payment Service—Another Way to Pay for Auction Items," Auctionbytes-Update, No. 8, Feb. 2000. [retrieved on Feb. 14, 2006], 4 pages Retrieved from: http://www.auctionbytes.com/cab/abu/y200/m02/abu0008/s03.

Wijnen, R., "You've Got Money!," Bank Technology News. Jun. 2000, vol. 13, Iss.6, [retrieved on Dec. 27, 2004]. 4 pages. Retrieved from: http://www.proquest.umi.com.

* cited by examiner

US 8,584,934 B2

CASH PAYMENT FOR REMOTE TRANSACTIONS

CROSS-REFERENCES TO RELATED APPLICATIONS

This application is a continuation of U.S. Pat. No. 8,286,861, entitled "CASH PAYMENT FOR REMOTE TRANSACTIONS," filed Aug. 23, 2011, which is a continuation of U.S. Pat. No. 8,025,212 filed Nov. 18, 2005, entitled "CASH PAYMENT FOR REMOTE TRANSACTIONS," which is a continuation-in-part of U.S. Pat. No. 6,994,251, filed May 22, 2003, entitled "CASH PAYMENT FOR REMOTE TRANSACTIONS," which is a continuation-in-part of U.S. Pat. No. 6,761,309, filed Nov. 7, 2002, entitled "METHOD AND SYSTEM FOR PERFORMING MONEY TRANSFER TRANSACTIONS," which is a continuation of U.S. Pat. No. 6,488,203, filed Oct. 26, 1999, entitled "METHOD AND SYSTEM FOR PERFORMING MONEY TRANSFER TRANSACTIONS." The entire disclosures of each of the foregoing applications and/or patents are incorporated herein by reference, for all purposes, as if fully set forth herein.

This application is also related to the following applications or patents: U.S. Pat. No. 7,849,006 entitled "ONLINE STAGING OF AUCTION SETTLEMENT TRANSACTIONS," filed Mar. 27, 2003, which is a continuation-in-part of U.S. patent application Ser. No. 10/262,529, entitled "WORLDWIDE CASH VENDOR PAYMENT," filed Sep. 30, 2002, which is a continuation-in-part of U.S. patent application Ser. No. 10/109,559, entitled "INTERNATIONAL NEGOTIABLE INSTRUMENT PAYMENT," filed Mar. 27, 2002; and U.S. patent application Ser. No. 10/045,313, entitled "INTERNET-BASED MONETARY PAYMENT SYSTEM," filed Oct. 24, 2001, which is a continuation of U.S. Pat. No. 7,110,978, entitled "INTERNET-BASED MONETARY PAYMENT SYSTEM," filed May 10, 1999. The entire disclosures of each of the foregoing applications and/or patents are incorporated by reference, for all purposes, as if fully set forth herein.

BACKGROUND OF THE INVENTION

This application related generally to methods and systems for executing remote transactions. More specifically, this application is related to methods and systems for executing remote transactions with cash payment.

In recent years, there has been a steady increase in the number of transactions performed remotely. Such transactions typically take place between a merchant and a customer who are remote from each other. For example, transactions for the sale of goods are now frequently executed between the merchant and customer by telephone, over the World Wide Web ("WWW"), or through another remote mechanism. Currently, such remote transactions are generally effected through the use of an account-based payment vehicle, such as with a credit card, a debit card, or a check. In some instances, an account-based surrogate for one of these vehicles may be used. For example, the Paypal® system sets up accounts that receive funds from a customer's credit, checking, or other traditional financial account, and uses these new accounts to provide payment for transactions. The use of such surrogate accounts is intended to help shield the underlying traditional financial-account information, but it still must at least be disclosed to the Paypal® system.

Various other security mechanisms also exist when transactions are performed remotely to limit the incidence of fraud, such as through the use of encryption of information when such information is transmitted electronically. The need for such security mechanisms is a reflection of the general fact that there is a significantly higher risk of fraud for remote transactions because the payment vehicle is not physically present during the transaction. In particular, these remote transactions rely on transmission of the account information from the customer, such as over the telephone or through a WWW interface, rather than extracting the information directly from the magnetic strip on a credit or debit card, for example. The increased risk of fraud in such remote transactions is reflected in the higher cost that must be borne by the merchant in the form of charges imposed by the financial institution that provides the payment vehicle. In most instances, higher costs are imposed whenever a transaction is performed without the instrument compared with performing the transaction with the instrument. In addition to restraining merchant participation in remote transactions, this risk of fraud is also well known to be a significant factor inhibiting customers from performing remote transactions.

These risks result in a large number of legitimate transactions not taking place as customers and/or merchants attempt to mitigate the risk of fraud. There is, accordingly, a general need in the art for improved methods and systems for executing remote transactions.

BRIEF SUMMARY OF THE INVENTION

Embodiments of the invention use coordination of a money-transfer system with a merchant transaction system to permit remote transactions with the merchant to be effected with cash or with noncash instruments. A customer making use of the service to pay for part or all of a remote transaction with the merchant begins by arranging for the transaction with the merchant, indicating the desire to pay in cash, and receiving a money-transfer transaction identifier. The customer may then visit a local branch of the money-transfer system, pay in cash for the transaction, and expect that the merchant will be advised of the payment and initiate execution of its obligations in accordance with the transaction.

Thus, in one set of embodiments, a method is provided for executing a remote transaction between a merchant and a customer. A designation of a monetary amount for the remote transaction and an identification of the merchant are transmitted from a merchant processing system to a host system controlled by a money-transfer provider. A money-transfer transaction identifier identifying a prepared money-transfer transaction for transfer of the monetary amount is established at the merchant processing system. The money-transfer transaction identifier is provided to the customer. Performance of merchant obligations in accordance with the remote transaction is initiated after notification to the merchant processing system of receipt of a cash payment made by the customer towards the prepared money-transfer transaction.

Establishment of the money-transfer transaction identifier may include receiving the identifier from the host system or may include agreeing to the identifier with the merchant and customer. In some such embodiments, the method may further comprise notifying the customer of an amount of the cash payment to be made to the money-transfer provider. The amount of the cash payment may be greater than the monetary amount. Initiation of performance obligations may be performed after transfer of the monetary amount by the money-transfer provider to the control of the merchant. Notification of the transfer could be received, for example, from the host system or from a financial institution holding the monetary amount on behalf of the merchant. The notification could be received substantially contemporaneously with the transfer of the monetary amount. In some cases, the financial institution holding the monetary amount on behalf of the merchant could be the money-transfer provider. In some instances, the remote transaction comprises a sale of a product from the merchant to the customer; initiating the performance of merchant obligations in such instances may comprise initiating shipment of the product to the customer. In other embodiments, the method may further comprise receiving, at the merchant processing system, a notification that the money-transfer transaction has been effected. Such a notification may be received from the host system. Alternatively, receiving such a notification may comprise receiving an acknowledgment of receipt of the monetary amount by a financial institution.

These methods may be embodied in a computer-readable storage medium having a computer-readable program embodied therein for directing operation of the merchant processing system. The merchant processing system may include a processor, a storage device, and a communications system. The computer-readable program includes instructions for operating the merchant processing system to execute a remote transaction in accordance with the embodiments described above.

In another set of embodiments, a method is provided for coordinating payment for a remote transaction between a merchant and a customer. A designation of a monetary amount for the remote transaction and an identification of the merchant are received at a host system from a merchant processing system. A money-transfer transaction identifier is transmitted from the host system to the merchant processing system to identify a prepared money-transfer transaction for transfer of the monetary amount. Thereafter, acknowledgment of receipt of a cash payment associated with the money-transfer transaction identifier is received at the host system. The prepared money-transfer transaction is effected by transferring the monetary amount to the control of the merchant.

In some embodiments, the merchant processing system is notified that the potential money-transfer transaction has been effected. Receipt of the designation of the monetary amount and transmission of the money-transfer transaction identifier may be performed over the Internet. In one embodiment, the cash payment is greater than the monetary amount.

In a further set of embodiments, a method is provided for coordinating payment for a remote transaction with a first party. An identification of the first party is received at a host system. Acknowledgment of receipt of a cash payment from a second party is received. The cash payment is associated with the identification of the first party. A money transfer corresponding to the cash payment to the control of the first party is executed with a request for the first party to perform on previously agreed terms of the remote transaction.

In some of these embodiments, the identification of the first party may comprise a money-transfer transaction identifier associated with the first party. Receiving acknowledgment of receipt of a cash payment from the second party may comprise receiving acknowledgment of receipt of a plurality of cash payments over a period of time. For example, each of the plurality of cash payments may be made by the same second party or may be made by different second parties. In one embodiment, each of the plurality of cash payments is for an amount less than a transaction amount identified by the previously agreed terms of the remote transaction to require performance by the first party on the remote transaction. Executing the money transfer may thus comprise executing the money transfer for at least the transaction amount after receiving sufficiently many of the plurality of cash payments that an aggregate amount of the sufficiently many of the plurality of cash payments is equal to at least the transaction amount. Alternatively, executing the money transfer may instead comprise executing the money transfer for one of the plurality of cash payments for the amount less than the transaction amount. In one embodiment, the remote transaction comprises a standing order, with one of a plurality of money transfers being executed after receipt of a respective one of the plurality of cash payments with a request for the first party to fulfill the standing order.

In a specific embodiment, a method is provided for coordinating payment for a remote transaction with a first party. An identification of the first party is received. Acknowledgment of receipt of a first cash payment from a first second party is received. The first cash payment is associated with the identification of the first party. A first money transfer corresponding to the first cash payment is executed to the control of the first party. Acknowledgment of receipt of a second cash payment from a second-second party later in time than the first cash payment is received. The second-second party is different from the first second party. The second cash payment is associated with the identification of the first party. A second money transfer corresponding to the second cash payment is executed to the control of the second party. A request for the first party to perform on previously agreed terms of the remote transaction is transmitted.

In another specific embodiment, a method is provided for coordinating payment for a remote transaction between a first party and a second party. An identification of the first party is received. Acknowledgment of receipt of a first cash payment from the second party is received. The first cash payment is associated with the identification of the first party. A first money transfer corresponding to the first cash payment is executed to the control of the first party. Acknowledgment of receipt of a second cash payment from the second party later in time than the first cash payment is received. The second cash payment is associated with the identification of the first party. A second money transfer corresponding to the second cash payment is executed to the control of the first party. A request for the first party to perform on previously agreed terms of the remote transaction is transmitted.

These methods may be embodied in a computer-readable storage medium having a computer-readable program embodied therein for directing operation of the host system. Such a host system may include a processor, a storage device, and a communications system. The computer-readable program includes instructions for operating the host system to coordinate payment for a remote transaction in accordance with the embodiments described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral and follows a hyphen to denote one of multiple similar components. When reference is made to a reference numeral without specification to an existing sub-label, it is intended to refer to all such multiple similar components.

DETAILED DESCRIPTION OF THE INVENTION

Embodiments of the invention provide methods and systems for executing remote transactions and for coordinating payment for remote transactions. As used herein, a "remote transaction" refers to an exchange of value among at least two physically separated parties. Usually, the physical separation of the parties requires that they interact through a communications device such as a telephone network, computer network, or the like. Such interaction may take place directly between the parties, or may take place with a human or machine representative of one or more of the parties. The machine representative could be a computer system programmed to implement policies of one of the parties in a transaction, some examples of which are discussed below. For example, the remote transaction may comprise a sale of goods and/or services in which the buyer and seller are in different geographical locations. In some instances, the seller may be a merchant seller, who may be represented by a telephone service representative who takes orders from customers or who may be represented by a suitably programmed merchant processing system accessible to the buyer over the an Internet, telephone, cable, or other network. In some embodiments, the methods and systems of the invention permit the execution of the transaction by at least one of the parties to be performed with cash despite the physical separation of the parties. As used herein, "cash" is intended to be construed to encompass cash equivalents, and therefore includes currency, banknotes, a generally endorsed negotiable instrument, and the like.

Figure 1A:
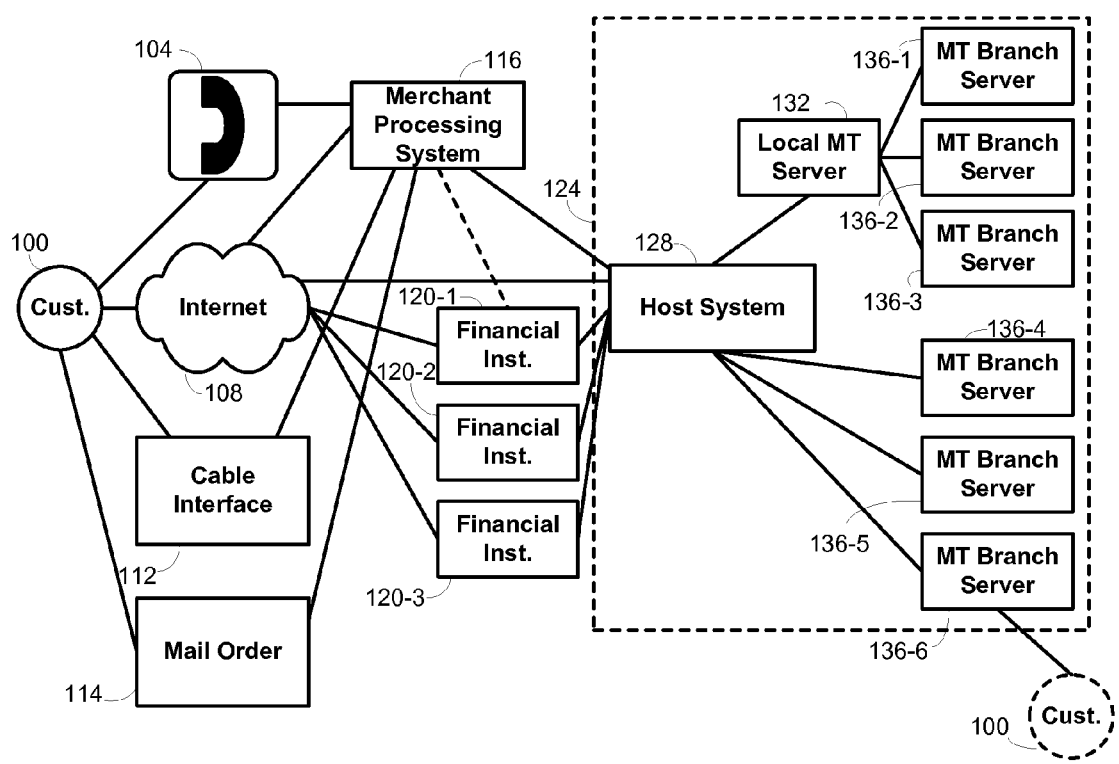
FIG. 1A is a block-diagram representation of an arrangement for performing remote transactions in accordance with an embodiment of the invention.

A structural overview of a system in accordance with an embodiment of the invention is provided in FIG. 1A. This example is provided specifically for an embodiment in which the remote transaction is to take place between a customer and a merchant, but it will be evident to those of skill in the art that the structural arrangement may be generalized to accommodate remote transactions between any types of parties. Thus, as used herein, a "merchant" is intended to refer to any party who is to receive a payment as part of a transaction executed with a customer, and could include a lender or other such party in addition to including a seller. The customer 100 may interact with the merchant using a variety of different interface mechanisms, some of which are shown explicitly in FIG. 1A. The manner in which the merchant is contacted may, in some instances, differ depending on the type of interface mechanism that is used. For example, in one embodiment, the interface mechanism is provided with the Internet 108 so that the customer may interact directly with the merchant processing system 116 using a PC, PDA, laptop, or other computational device equipped to connect to the Internet 108. In this embodiment, the merchant processing system 116 also comprises a computational device equipped to connect to the Internet, and having programming as described further below to implement embodiments of the invention.

In other embodiments, a cable interface 112 or telephone interface 104 may be used for the customer 100 to interact directly with the merchant processing system 116. In the case of a telephone interface 104, direct interaction between the customer 100 and merchant processing system 116 may use a DTMF decoder comprised by the telephone interface 104. Such a DTMF decoder permits the customer 100 to use touch-tone commands on a local telephone to interact with the merchant processing system 116. It may be convenient to accommodate the limitations of DTMF tones by using a menu-driven interface. The use of a telephone interface 104 may be especially suitable in direct-response applications where the customer responds almost immediately to seeing or hearing an advertisement. In other embodiments, the interaction between the customer 100 and the merchant processing system 116 may be indirect. For example, the telephone interface 104 could instead be configured for routing of voice signals to a human customer-service representative. The customer-service representative would then input data to the merchant processing system 116 with an input device such as a keyboard, mouse, light pen, etc. in response to communications with the customer 100. In addition, other embodiments of the invention may make use of a mail-order service 114 in which print media may be used in interacting with the merchant processing system 116.

The system also includes a networking capability for the merchant processing system 116 to interact with a money-transfer system 124. Even in embodiments where the customer 100 interacts with the merchant processing system through means other than the Internet 108, this interaction may take place through the Internet 108, although this is not required. More generally, any suitable networking configuration may be used to provide interaction between the merchant processing system 116 and the money-transfer system 124, including through the use of dedicated networks, a phone network, a wide-area network, a local-area network, a wireless network, and the like. The same or a different network may also be used to provide the merchant processing system 116 and/or money-transfer system 124 with the ability to exchange information with financial institutions 120. In the illustrated embodiment, the financial institutions are shown interfaced with the Internet 108, as well as having direct communications with the money-transfer system. The dashed line between the merchant processing system and a particular one of the financial institutions 120-1 indicates that the merchant may hold an account at that financial institution 120-1. As explained below, the funds received by the merchant as a result of the transaction with the customer 100 may ultimately be provided to the account at financial institution 120-1. While for purposes of illustration only a single merchant processing system 116 is shown in FIG. 1A, the system may more generally comprise a plurality of merchant processing systems associated with a plurality of merchants. The plurality of merchant processing systems are integrated within the system in the same fashion as the illustrated merchant processing system 116, thereby providing the plurality of merchants with the ability to participate in remote transactions that use cash payments by customers. Because the communications among the customer 100, merchant processing system 116, and money-transfer system 124 may involve sensitive financial data, it may be desirable to secure the data, such as by encrypting it before transmission.

The money-transfer system 124 itself may comprise a networked arrangement, with interactions with the Internet 108 or other network, financial institutions 120, and/or merchant processing systems 116 being coordinated through a host system 128. Advantageously, the money-transfer system 124 may be configured to permit interaction between the host system 128 and a large number of money-transfer branch servers 136. In such an embodiment, the money-transfer branch servers 136 may be associated with local branches of the money-transfer system 124 that may be visited by customers. The money-transfer branch servers 136 may communicate with the host system 128 through zero or more local money-transfer servers 132, each of which is configured for coordinating portions of the money transfers handled by the system. For example, branch servers 136-1, 136-2, and 136-3 communicate with the host system 128 through local server 132, but branch servers 136-4, 136-5, and 136-6 communicated with the host system 128 directly. Usually the money-transfer branches will offer a variety of different money-transfer services and are not limited to providing services to support remote transactions between merchants and customers. Moreover, in some instances, the branches may additionally offer a variety of unrelated services, such as in cases where the money-transfer branches are located at convenience stores, supermarkets, and the like. In addition, it is advantageous when the number of such branches is sufficiently large to provide significant coverage of selected geographic areas. Such coverage permits convenient access to the money-transfer system 124 by customers living or working in the selected geographic areas—greater geographic coverage thus corresponds to a greater accessibility by more customers. In FIG. 1A, access of the money-transfer system 124 by the customer 100 is performed at a money-transfer branch server 136 and indicated schematically with the dashed-line customer block 100.

Figure 1B:
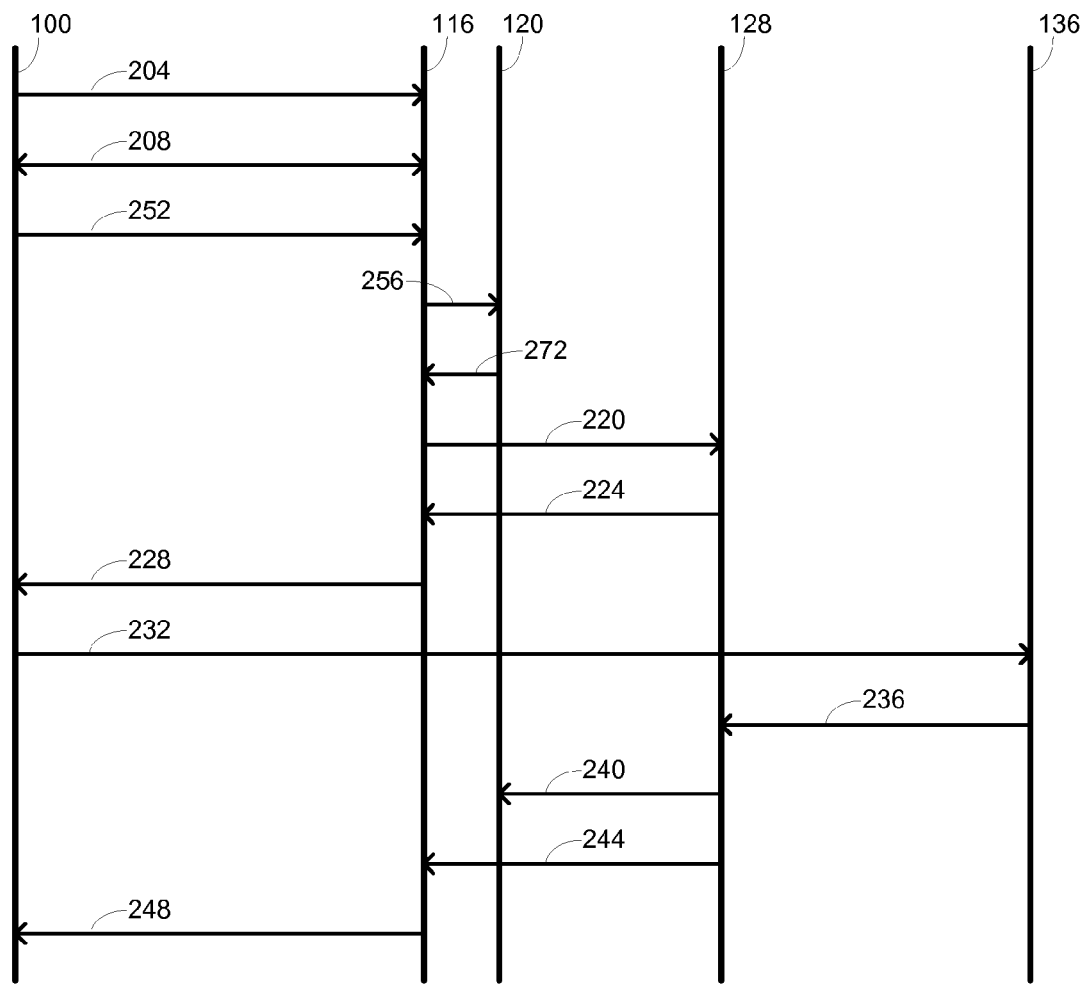
FIG. 1B is a schematic representation of an embodiment of a method for performing remote transactions using the arrangement shown in FIG. 1A.
Figure 2A:
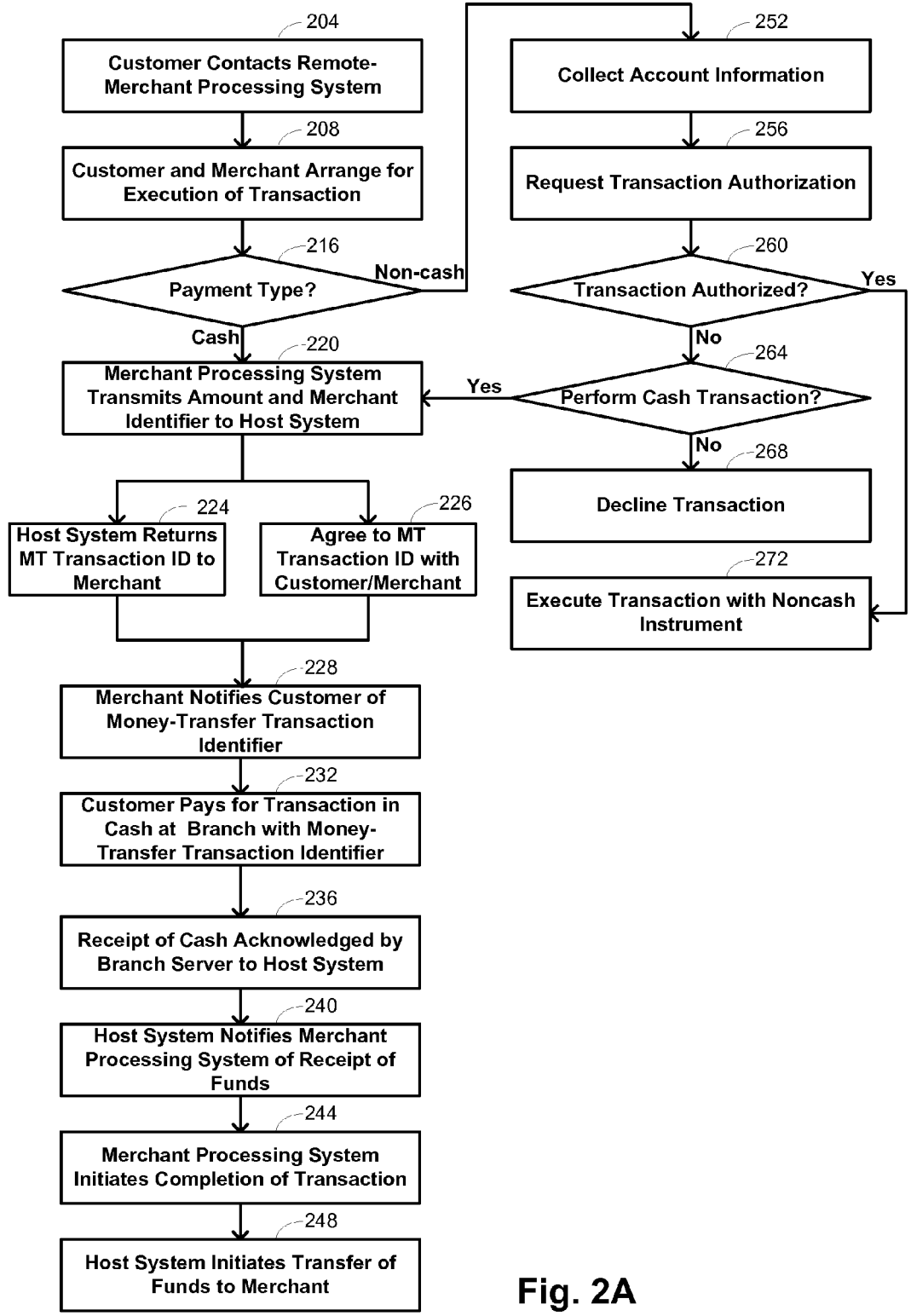
FIG. 2A is a flow diagram illustrating embodiments for executing remote transactions and coordinating payment for remote transactions.

FIGS. 1B and 2 depict the implementation of remote transactions that use the arrangement shown in FIG. 1A. As will be evident from the following discussion, both cash and noncash remote transactions may be accommodated with the structure of FIG. 1A. FIG. 1B schematically shows the flow of interactions between different components of the system while FIG. 2A provides a flow diagram that details specific implementations in different embodiments. The vertical lines in FIG. 1B correspond to some of the blocks in FIG. 1A and the arrows in FIG. 1B correspond to blocks in the flow diagram of FIG. 2A. The following description thus makes reference to both FIGS. 1B and 2A simultaneously.

As indicated at block 204, a remote transaction between a merchant and a customer may begin with establishment of contact between the customer 100 and a remote-merchant processing system 116. Such contact may be established solely through an automated interface such as described above for an Internet interface, DTMF interface, cable interface, and the like. Such contact may also be established at least partially with a human intermediary such as in the form of a customer-service representative. At block 208, the customer and merchant arrange for execution of a transaction. For example, in one embodiment the transaction corresponds to the purchase of goods from the merchant over the Internet 108. In such an embodiment, the merchant processing system 116 is configured to provide access to product information over the Internet 108 and an interface to collect customer selections. After the customer has confirmed selections, the merchant processing system 116 may calculate the total amount due, including any taxes, service charges, delivery charges, and the like. In another embodiment, the transaction corresponds to the purchase of goods from a paper catalogue. In such an embodiment, the customer 100 telephones a customer-service representative to request a purchase of goods that he has selected from the paper catalogue, indicating to the representative such factors as model numbers, colors, quantities and the like. This information is provided to the merchant processing system 116 by the representative, such action taking the place of the automatic collection of such information in the Internet-based example. These two examples are sometimes referred to in the following description to illustrate application of the methods in a specific context, but it should be appreciated that these examples are not intended to be limiting and that the methods of the invention may also be applied to other types of remote transactions in other embodiments.

At block 216, the customer may be provided with the opportunity to select one of a plurality of different types of payment, such as a credit-card payment, debit-card payment, check payment, and cash payment. Such a choice may be conveyed directly to the customer 100 by the merchant processing system 116 or through the customer-service representative in different embodiments. If the customer 100 selects a noncash payment type, account information is collected at block 252. Such account information is associated with the noncash payment type and may identify, for example, a credit-card number, a debit-card number, a checking-account number, etc. In some instances, collection of the account information may be accompanied with collection of verification information, such as name associated with the account, expiration date of a credit or debit card, verification code printed on a credit or debit card, and the like. A request for authorization of the transaction is presented to the financial institution responsible for the account at block 256, such as by transmitting the collected account information and transaction amount over a financial network or securely over the Internet 108 to that financial institution.

If the financial institution returns an authorization code, as tested at block 260, the transaction may be executed with the noncash instrument at block 272. In particular, the amount of the transaction is charged to the credit card, debit card, or checking account, and the merchant processing system 116 provides instructions to initiate shipment of the purchased goods to the customer 100. If the transaction is denied, as indicated through return of a non-authorization code, the customer 100 may still be offered the opportunity to execute a cash transaction. If the customer 100 does elect at block 264 to proceed with a cash payment, the method may proceed in the same fashion as if a cash payment were elected at block 216. If the customer 100 decides against making a cash payment after the noncash payment has been refused, the transaction is declined by the merchant processing system 116 at block 272.

It is also noted that in some embodiments, multiple types of payments may be made for a single transaction. For example, it is possible that a portion of the transaction cost is paid with cash and a portion is paid with a noncash instrument. The cash portion of such a hybrid transaction is executed as described below and the noncash portion is executed by collecting account information and requesting a transaction authorization as described above. Furthermore, some transactions may begin as hybrid transactions, but be converted to purely cash transactions should a non-authorization code be returned for the noncash portion of the transaction and the customer 100 indicate a desire to perform that portion of the transaction also in cash. Also, the noncash portion of any transaction, whether a purely noncash transaction or a hybrid transaction, may be made with multiple types of noncash instruments. For example, a portion of the transaction could be made with a credit card and a portion of the payment could be made with a debit card.

Once a determination has been made to proceed with a cash payment for the remote transaction, either as an initial choice by the customer 100 at block 216 or as an alternative choice by the customer 100 at block 264, interaction with the money-transfer system 124 is invoked to complete the transaction.

Thus, at block 220, the merchant processing system 116 transmits transaction information that includes a monetary amount and an identification of the merchant to the host system 128. In most instances, the monetary amount corresponds to the amount required to complete the transaction, but in some instances it may differ. For example, in cases of hybrid transactions where a portion of the transaction is executed with a noncash instrument while the remainder is executed with cash, the monetary amount could correspond to the portion of the transaction to be executed in cash.

The merchant identification may be, for example, a numeric or alphanumeric identifier assigned by the money-transfer system 124 and which identifies where funds are to be transferred in order to be placed under the control of the merchant. In the example shown in FIG. 1A, financial institution 120-1 is used by the merchant to receive funds transferred by the money-transfer system 124. Accordingly, the merchant identification is associated in records maintained by the host system 128 with a particular account maintained on behalf of the merchant at financial institution 120-1.

In response to the request from the merchant processing system 116, the host system prepares a money-transfer transaction for the monetary amount. This prepared money-transfer transaction specifies that upon receipt of a certain amount of funds, the monetary amount will be transferred to control of the merchant, such as into the account of the financial institution 120-1 identified from the merchant identifier. As part of this preparation, a money-transfer transaction identifier is established to identify this prepared money-transfer transaction. Establishing the money-transfer transaction identifier may be performed in a number of different ways in different embodiments. In some instances, the money-transfer transaction identifier is generated by the host system and returned to the merchant at block 224. In other instances, the money-transfer transaction identifier comprises any transaction identifier that ties the corresponding money transfer to the transaction and is agreed to by the customer and merchant, as indicated at block 226. For example, the money-transfer transaction identifier could be an order number, the customer's telephone number, or any other suitable identifier. In some embodiments, the money-transfer transaction identifier is returned to the merchant processing system 116.

At block 228, the merchant notifies the customer 100 of the money-transfer transaction identifier. Such notification may often include a notification of the total amount that the customer 100 will need to provide in order to effect the cash transaction. Often this amount exceeds the monetary amount to be transferred by the money-transfer system 124 to reflect imposition of a fee for the services of the money-transfer system 124. The amount of this fee could be a fixed amount to accommodate any cash transaction for the merchant so that the merchant processing system 116 automatically adds the fixed amount to the amount to be transferred before notifying the customer 100. In other instances, the fee could vary depending on such factors as the size of transaction, whether there are currency conversions to be included, where the money transfer effected by the money-transfer system 124 is to be initiated, and the like. In such instances, the fee could be computed by the host system 128 and transmitted to the merchant by the host system 128 with the money-transfer transaction identifier; the merchant processing system 116 could then subsequently add the fee to the amount to be transferred before notifying the customer of the total amount that will be due. In still other embodiments, the customer might not be informed of the precise fee to be charged for the money-transfer service, learning its amount only upon visiting a branch of the money-transfer system 124 to make the cash payment.

At block 232, the customer pays in cash at one of the branches of the money-transfer system 124. Such a cash payment may be for the entire transaction or may be for a portion of the transaction. The advantage of having a plurality of such branches is evident at this point in the process since the extent of geographical coverage by the branches is directly related to the convenience with which the customer 100 may access a branch to effect payment. In some embodiments, collection of the funds may be performed by a clerk at the branch, although such collection may also be performed in a more automated fashion with a kiosk or other self-service device. For example, at a branch having a clerk, the customer 100 might provide the money-transfer transaction identifier to the clerk, who inputs it into the money-transfer branch server 136. The money-transfer branch server 136 sends a query through the network of the money-transfer system 124 to the host system 128 to determine the amount to be collected for the prepared money-transfer transaction. This amount may be displayed to the clerk, who collects the amount from the customer 100, and who then inputs an acknowledgment of its collection to the money-transfer branch server 136. A similar process may be followed when the customer 100 uses a self-service device. An input device such as a keypad may be provided on the self-service device for the customer 100 to enter the money-transfer transaction identifier; an output device such as a display screen may be provided to indicate the amount of funds to be provided; and a cash acceptor may be provided to receive cash payments from the customer. Such a self-service device may be integrated with or in communication with the money-transfer branch server 136 so that queries and responses to the host system 128 to identify the prepared money-transfer transaction may be performed in the same fashion as when a clerk interacts with the customer 100.

In some embodiments, hybrid transactions that use cash for a portion of the transaction and a noncash instrument for the remainder of the transaction may be accommodated entirely with the customer's interaction with the money-transfer branch. In such embodiments, the cash portion of the transaction may be processed as described above. The noncash portion may be processed by collecting account information with the money-transfer branch server 136, either through a clerk or directly with a self-service device. In embodiments that use a self-service device, the self-service device may comprise a magnetic-strip reader, a smart-card reader, a barcode reader, a magnetic-ink character reader, an optical reader, or other suitable device for reading information directly from an instrument that may be presented by the customer 100 to effect the noncash portion of the transaction. In embodiments that do not use a self-service device, a point-of-sale device having such capabilities may be provided at the money-transfer branch for use by the clerk or customer in effecting the noncash portion of the transaction. Examples of devices that include multiple capabilities for extracting information from such instruments are provided in the following applications or patents, the entire disclosures of which are incorporated herein by reference for all purposes: U.S. Prov. Pat. Appl. No. 60/147,889, entitled "INTEGRATED POINT OF SALE DEVICE," filed Aug. 9, 1999; U.S. Pat. No. 6,547,132, entitled "POINT OF SALE PAYMENT SYSTEM," filed Aug. 9, 2000; U.S. Pat. No. 7,600,673, entitled "SYSTEMS AND METHODS FOR PERFORMING TRANSACTIONS AT A POINT-OF-SALE," filed Apr. 3, 2002; U.S. Pat. No. 6,886,742, entitled "SYSTEMS AND METHODS FOR DEPLOYING A POINT-OF-SALE SYSTEM," filed Apr. 3, 2002; U.S. Pat. No. 6,827,260, entitled "SYSTEMS AND METHODS FOR UTILIZING A POINT-OF-SALE SYSTEM," filed Apr. 3, 2002; and U.S. Pat. No. 7,086,584, entitled "SYSTEMS AND METHODS FOR CONFIGURING A POINT-OF-SALE SYSTEM," filed Apr. 3, 2002.

Once the money-transfer branch server 136 has confirmation of receipt of cash for the cash transaction, either through receipt from a self-service device or through receipt of an indication from a clerk that it has been received, an acknowledgment of its receipt is transmitted from the branch server 136 to the host system 128 at block 236. Receipt of the acknowledgment by the host system 128 prompts the host system 128 to effect a transfer of funds in accordance with the prepared money-transfer transaction. The amount transferred may be less than the amount received from the customer 100 to reflect retention of the service charge by the money-transfer system 124. Thus, at block 240, the host system notifies the merchant that the funds have been received from the customer 100. In some instances, such a notification may be made substantially contemporaneously with the actual transfer of funds. Receipt of such a notification prompts the merchant processing system 116 to initiate completion of the transaction at block 244, such as by issuing instructions to perform merchant obligations to package and ship the goods purchased by the customer 100 in accordance with the transaction. At block 248, the host system 128 initiates a transfer of funds to the control of the merchant, such as by transferring funds to the merchant's account at financial institution 120-1. Effecting such a transfer may be performed in a variety of different ways in different embodiments. For example, the transfer could be effected by sending a debit instruction to a financial institution having funds controlled by the money-transfer system 124 and sending a credit instruction to financial institution 120-1, could be effected using an automated clearing house ("ACH"), could be effected by generating a negotiable instrument such as a check, and the like.

The order of the blocks shown in FIG. 2A is merely exemplary, and the corresponding functions could be performed in a different order in a variety of alternative embodiments, or some of the functions could be performed simultaneously. For example, the initiation of the funds transfer by the host system 128 to the control of the merchant at block 248 could be performed before, after, or simultaneously with the notification to the merchant processing system 116 at block 240. In embodiments where it is performed after, the notification could further specify that the funds have been successfully transferred to the control of the merchant. In other alternative embodiments, the notification could instead be provided by financial institution 120-1 that the funds had been received.

In some embodiments, multiple partial cash payments may be made to provide funds for performing the transaction. Such embodiments are illustrated with the flow diagram of FIG. 2B, and may be useful in such applications as providing a mechanism for layaway payments for a purchase and/or for having multiple different parties contribute towards a purchase. Further aspects of having contributions from multiple different parties are described in U.S. Pat. No. 7,225,154, entitled "METHODS AND SYSTEMS FOR COORDINATING POOLED FINANCIAL TRANSACTIONS," filed Mar. 17, 2003, the entire disclosure of which is incorporated herein by reference for all purposes.

Figure 2B:
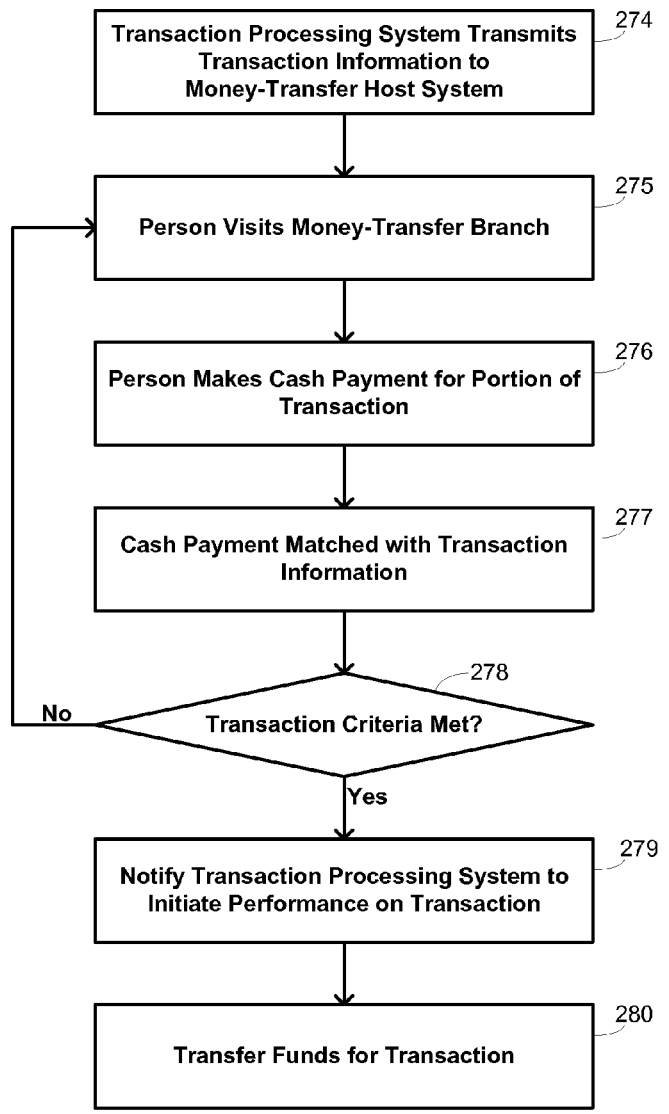
FIG. 2B is a flow diagram illustrating embodiments in which multiple remote payments are made for a transaction.

The flow diagram of FIG. 2B emphasizes that the parties to such transactions need not be in a merchant/customer relationship, but may be any remote parties wishing to execute a transaction that has a cash component. Aspects of the method described in connection with FIG. 2A may thus be incorporated into the method, with the flow diagram beginning at block 274 when the transaction processing system transmits transaction information to a money-transfer host system. Such transaction information generally includes an identity of a first party to the transaction and may additionally include a designation of a total monetary amount to be used in supporting the transaction. In some embodiments, the transaction information may include a money-transfer transaction identifier to be used in identifying the transaction, although other mechanisms may alternatively be used to identify specific transactions.

Funds to be used in support of the transaction may be supplied in cash by one or more second parties. In some instances, a portion of the total transaction cost may be paid through other mechanisms, either at the time the transaction is arranged or at the time one of the multiple payments is made. Aspects of including multiple payment mechanisms are described more fully above in connection with FIG. 2A. As indicated at block 275, a person who is to make a cash payment visits a money-transfer branch. The person makes the cash payment for a portion of the transaction less than its total amount at block 276, and this payment is matched with the transaction information at block 277. In embodiments where a money-transfer transaction identifier was provided, such matching may comprise receiving an indication of the money-transfer transaction identifier from the person making the payment and matching that with a list of outstanding money-transfer transaction identifiers. Other methods that may be used to make the match may include using the name of the first party and/or one of the second parties to the transaction, or any other information that may uniquely identify the transaction information.

A check is made after the cash payment is matched with the transaction information whether the transaction criteria have been met, as indicated at block 278. Usually, meeting the transaction criteria includes having received payment that equals or exceeds the transaction amount. In embodiments where multiple cash payments are made before the transaction criteria are met, the method will loop at least once back to block 275, where another person visits the money-transfer branch to make an additional cash payment. In some embodiments, this person may be the same person who made a prior payment, such as in embodiments where payment for a transaction is being made in cash on a layaway basis. In other embodiments, this person may be a different individual, such as in embodiments where multiple parties contribute to payment for the transaction.

Once the transaction criteria have been met, the transaction processing system is notified at block 279 that performance by the first party on the transaction should be initiated. Funds collected to support the transaction are transferred to the control of the first party at block 280. While such transfer is identified at the end of the flow diagram of FIG. 2B, this represents only one of several possibilities for effecting the funds transfer. In some embodiments, like the one illustrated explicitly in the drawing, the total funds needed to support the transaction are transferred only after they have all been collected. In other embodiments, the funds may be transferred at different intervals, such as in embodiments where funds corresponding to each of the cash payments are transferred shortly after receipt of the cash payments. In still other embodiments, the funds may be transferred periodically, such as on the first business day of each month. Such embodiments are advantageous in circumstances where payments are both made over time, such as in implementing a layaway scheme, and made by multiple second parties—each of the second parties making payments may make a payment at different times during the periodic cycle, with the full payment for that cycle being transferred to the first party at the end of the cycle.

Figure 2C:
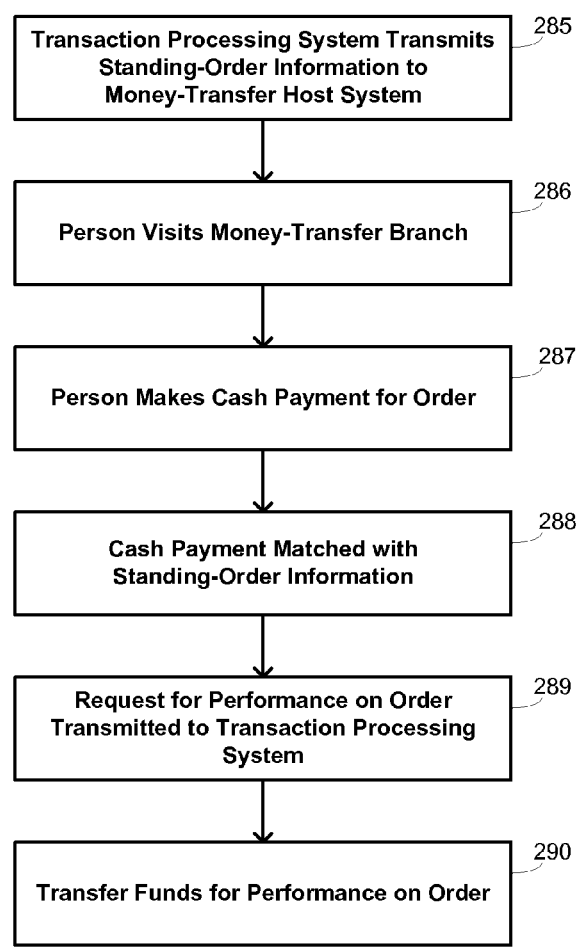
FIG. 2C is a flow diagram illustrating embodiments in which standing-order transactions are executed.

An illustration of embodiments in which standing orders may be implemented is provided with the flow diagram of FIG. 2C. When a standing-order arrangement is established between parties, the transaction processing system may transmit information about the arrangement to the money-transfer host system at block 285. Such information may include details identifying the first party to whom payments are to be made to trigger performance on the standing-order arrangement, amounts that may be required, and the like. In some embodiments, this information includes a series of money-transfer transaction identifiers that are to be used to effect individual transfers based on cash payments.

As in other embodiments, a person thus visits a money-transfer branch office at block 286. This person may be the second party to the standing-order arrangement or may be another person who makes payments as part of a multi-person arrangement. The person makes cash payment for the order at block 287 and the cash payment is matched with the standing-order information. In some instances, a match need not be made with all of the standing-order information, but only with that portion of the information used in prompting performance on the order. This may be the case, for instance, where the standing-order information comprises a plurality of money-transfer transaction identifiers, in which case the match may be based on a particular one of the identifiers being provided by the person making the cash payment. A request for performance on the order is accordingly transmitted to the transaction processing system at block 289 and funds for performance on the order are transferred at block 290.

Embodiments that make use of standing orders may advantageously find application in relationships between a manufacturer and a supplier. The manufacturer may need supplies on a periodic basis from the supplier and may use cash for transactions. Upon arrangement of a standing order for supplies, the supplier may provide the transaction processing system with a series of money-transfer identifiers. Each month, the manufacturer would then visit a money-transfer branch, supply one of the money-transfer identifiers, and make a cash payment. The money-transfer identifier would be used to effect a money transfer to the supplier and to notify the supplier that delivery of supplies should be made. In some instances, different money-transfer identifiers could be associated with different supplies so that variations in orders could be implemented by selection of appropriate identifiers. In addition, other terms may be applied to the orders, such as by combining the method outlined in FIG. 2C with the method shown in FIG. 2B so that multiple payments may be made, with performance only being initiated when the total payment exceeds a certain level. Excess payments could act as balances to be applied to the next order.

Figure 3:
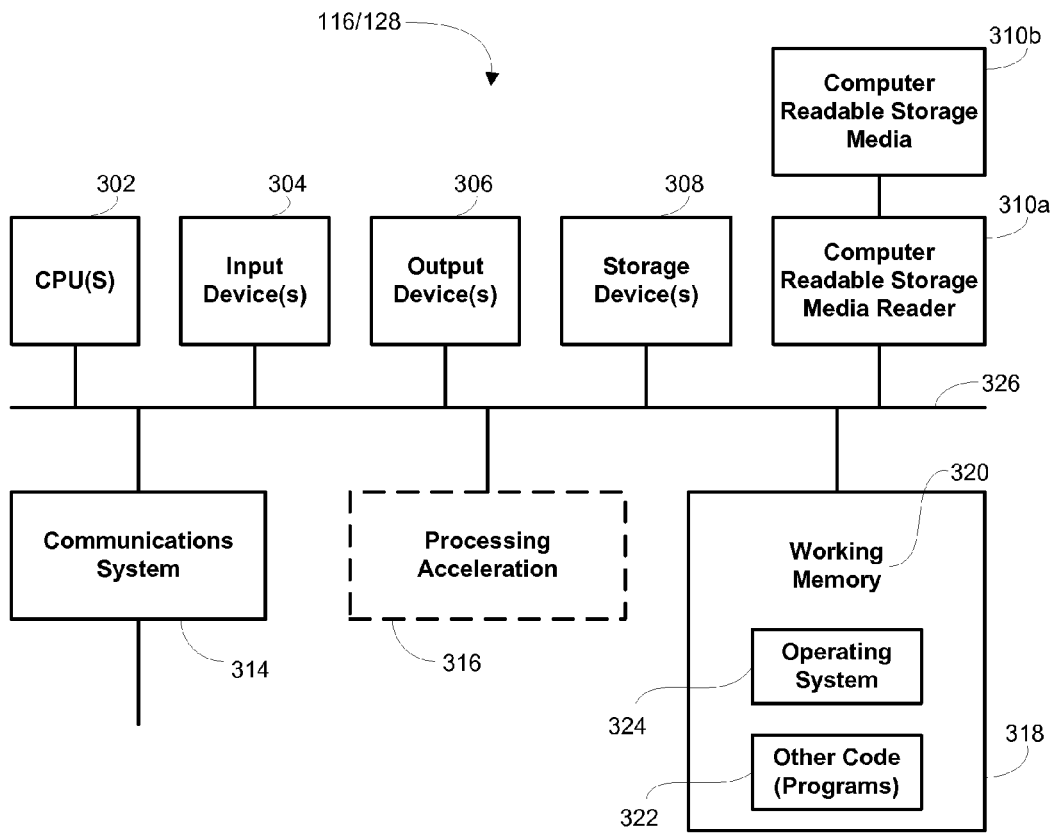
FIG. 3 is a schematic illustration of a host system or merchant processing system on which methods of the invention may be embodied.

FIG. 3 provides a schematic illustration of a structure that may be used to implement the merchant processing system 116 and/or host system 128. While the structure of the merchant processing system 116 and host system 128 are not generally expected to be identical, either or both of them may be implemented using computer systems having some or all of the following components. FIG. 3 broadly illustrates how individual system elements may be implemented in a separated or more integrated manner. The computer system is shown comprised of hardware elements that are electrically coupled via bus 326, including a processor 302, an input device 304, an output device 306, a storage device 308, a computer-readable storage media reader 310*a*, a communications system 314, a processing acceleration unit 316 such as a DSP or special-purpose processor, and a memory 318. The computer-readable storage media reader 310*a* is further connected to a computer-readable storage medium 310*b*, the combination comprehensively representing remote, local, fixed, and/or removable storage devices plus storage media for temporarily and/or more permanently containing computer-readable information. The communications system 314 may comprise a wired, wireless, modem, and/or other type of interfacing connection and permits data to be exchanged with the Internet, DTMF processor, cable processor, financial institutions 120, local money-transfer servers 132, and/or money-transfer branch servers 136 as described in connection with FIGS. 1A-2.

The computer system also comprises software elements, shown as being currently located within working memory 320, including an operating system 324 and other code 322, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for coordinating payment for a remote transaction with a first party, the method comprising:
    receiving, at a host system, an identification of a desired purchase by a second party from the first party;
    receiving, at the host system, a selection of a cash payment option by the second party;
    sending, from the host system, a transaction identifier for receipt by the second party;
    receiving, at the host system, the transaction identifier and acknowledgment of receipt of a cash payment from the second party; and
    associating, with the host system, the cash payment with the identification of the desired purchase by the second party from the first party.

2. The method for coordinating payment for a remote transaction with a first party of claim 1, wherein receiving the identification of a desired purchase comprises:
    receiving instructions for an online purchase.

3. The method for coordinating payment for a remote transaction with a first party of claim 1, wherein sending the transaction identifier comprises:
    sending a money-transfer transaction identifier.

4. The method for coordinating payment for a remote transaction with a first party of claim 1, wherein sending the transaction identifier comprises:
    sending affirmation of a transaction identifier generated by the second party.

5. The method for coordinating payment for a remote transaction with a first party of claim 4, wherein the transaction identifier comprises:
    a phone number of the second party.

6. The method for coordinating payment for a remote transaction with a first party of claim 1, wherein receiving the transaction identifier and acknowledgment of receipt of the cash payment from the second party comprises:
receiving acknowledgment of receipt of the cash payment at a local branch of a money-transfer service.

7. The method for coordinating payment for a remote transaction with a first party of claim 1, wherein receiving the transaction identifier and acknowledgment of receipt of the cash payment from the second party comprises:
receiving acknowledgment of receipt of the cash payment at a retail location.

8. The method for coordinating payment for a remote transaction with a first party of claim 1, wherein receiving the transaction identifier and acknowledgment of receipt of the cash payment from the second party comprises:
receiving acknowledgement of receipt of the cash payment at a self-service kiosk.

9. The method for coordinating payment for a remote transaction with a first party of claim 1, wherein associating the cash payment with the identification of the desired purchase by the second party from the first party comprises:
determining the desired purchase is associated with the transaction identifier.

10. The method for coordinating payment for a remote transaction with a first party of claim 1, wherein the method further comprises:
notifying the second party that the first party is prepared to provide a good or service according to agreed terms of the remote transaction.

11. The method for coordinating payment for a remote transaction with a first party of claim 10, wherein notifying the second party that the first party is prepared to provide a good or service comprises:
providing the good or services to the second party.

12. The method for coordinating payment for a remote transaction with a first party of claim 10, wherein notifying the second party that the first party is prepared to provide a good or service comprises:
initiating shipment of the good to the second party.

13. The method for coordinating payment for a remote transaction with a first party of claim 10, wherein notifying the second party that the first party is prepared to provide a good or service comprises:
sending, from the host system, a message that the first party is to provide the good or service to the second party.

14. The method for coordinating payment for a remote transaction with a first party of claim 1, wherein the method further comprises:
receiving, at the host system, a query of an amount due from the second party associated with the transaction identifier;
sending, from the host system, the amount due; and
displaying to a clerk the amount due.

15. A non-transitory machine readable medium having instructions stored thereon for coordinating payment for a remote transaction with a first party, the instructions executable by a processor for at least:
receiving an identification of a desired purchase by a second party from the first party;
receiving a selection of a cash payment option by the second party;
sending a transaction identifier for receipt by the second party;
receiving the transaction identifier and acknowledgment of receipt of a cash payment from the second party; and
associating the cash payment with the identification of the desired purchase by the second party from the first party.

16. The non-transitory machine readable medium of claim 15, wherein sending the transaction identifier comprises:
sending a money-transfer transaction identifier.

17. The non-transitory machine readable medium of claim 15, wherein receiving the transaction identifier and acknowledgment of receipt of the cash payment from the second party comprises:
receiving acknowledgment of receipt of the cash payment at a local branch of a money-transfer service.

18. The non-transitory machine readable medium of claim 15, wherein the instructions are further executable by the processor for at least:
receiving a query of an amount due from the second party associated with the transaction identifier; and
sending the amount due for display to a clerk.

19. A system for coordinating payment for a remote transaction with a first party, the system comprising:
a host system, the host system configured to:
receive an identification of a desired purchase by a second party from the first party;
receive a selection of a cash payment option by the second party;
send a transaction identifier for receipt by the second party;
receive the transaction identifier and acknowledgment of receipt of a cash payment from the second party; and
associate the cash payment with the identification of the desired purchase by the second party from the first party.

20. The system for coordinating payment for a remote transaction with a first party of claim 19, the system further comprising:
a branch system, the merchant system configured to:
receive, from the second party, the transaction identifier;
send, to the host system, the transaction identifier;
receive, from the host system, an amount due; and
send, to the host system, the acknowledgment of receipt of the cash payment.

* * * * *